March 20, 1956    P. J. PAZITNEY, JR., ET AL    2,738,549

EXTRUDING MACHINE

Filed July 26, 1952

INVENTOR.
PAUL J. PAZITNEY, JR.
BY ORVILLE C. DEWEESE

Willits, Hardman & Fehr
their ATTORNEYS

2,738,549
EXTRUDING MACHINE

Paul J. Pazitney, Jr., and Orville C. De Weese, Dayton, Ohio, assignors to General Motors Corporation, Detroit, Mich., a corporation of Delaware Application July 26, 1952, Serial No. 301,038

2 Claims. (Cl. 18—12)

This invention relates to a method and apparatus for extruding strip material from rubber-like stock by use of a conventional tuber. The invention is directed specifically to a multiple die head for a single tuber wherein control valves are provided adjacent each die orifice so that the speed of exit from each extrusion die is controlled.

The primary object of this invention is to extrude a plurality of strip forms from a single extruding device. This is accomplished by fitting the die orifices each with a tapered bushing insert and adjusting valve heads at the entrance to the bushings so that the flow of stock material to each die may be controlled.

Further objects and advantages of the present invention will be apparent from the following description, reference being had to the accompanying drawings wherein a preferred embodiment of the present invention is clearly shown.

Figure 1:
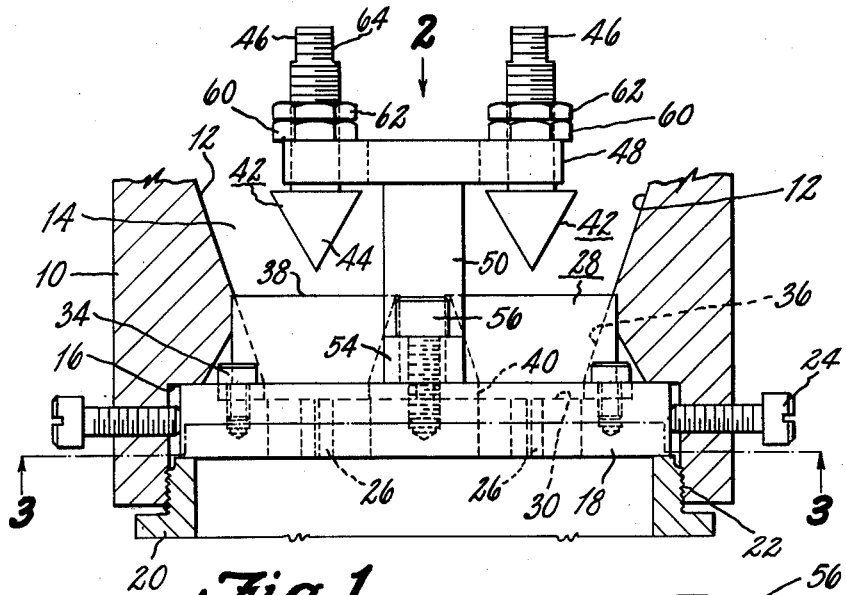
Figure 2:
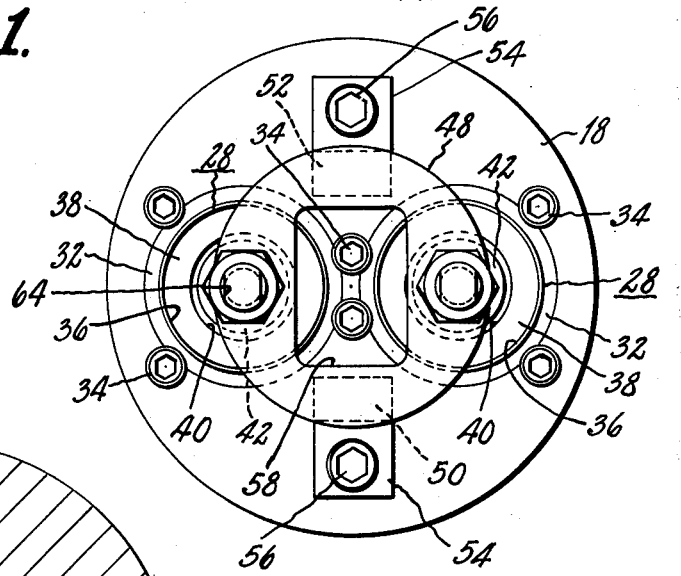
Figure 3:
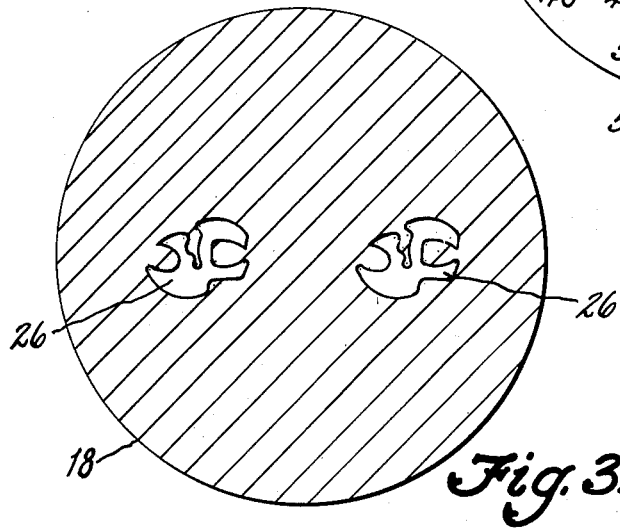

In the drawings:
Figure 1 is a longitudinal sectional view of the end of a tubing machine, fitted with the subject invention;
Figure 2 is a plan view of the die-head assembly; and
Figure 3 is a sectional view of the die plate.

With particular reference to the drawings, 10 refers to a terminal member of a tuber that provides a tapered interior wall 12 representing the last stage of turbulation for the stock material before it is extruded as the end product. A chamber 14 is thereby provided which is constantly supplied with the stock material under the urge of pressure by a plodder or screw of the usual form. The member 10 has a shoulder 16 against which is seated a die plate 18 which is held in position by a ring nut 20 threaded into the member 10 as at 22. Set screws 24 operate to align the die-head with the tapered cavity 14. Provided by the die plate 18 there are extrusion orifices 26 defining the contour of the product to be extruded. On the back side of the die plate there are bushings 28 seated in wells 30 concentric each with a die orifice 26. The bushings each have a flange 32 engageable by a plurality of cap screws 34 threaded into the die plate 18 substantially as shown in Fig. 1.

These bushings 28 have a tapered or conical bore 36 converging from a large diameter 38 to a small diameter 40, the smaller diameter 40 feeding directly to the die orifice 26. Disposed in axial alignment with these die orifices, or preferably with the tapered bores in the bushings, there are valve structures 42 cooperable with the bores of the bushings to control the flow of stock material to the die orifices. There are as many valve structures 42 as there are die orifices and bushings, each valve structure comprising a conic head 44 mounted on a stem 46 threaded into a bridge member 48 supported by a pedestal or leg 50, 52 each having a foot 54 clamped against the back side of the die plate 18 by a hold-down screw 56. As shown in Fig. 2 the bridge member 48 constitutes a circular disc having a rectangular opening 58 centrally thereof, the longer axis of the opening being in line with the hold-down screws 56 for the supporting legs. In the edge of the bridge member 48 there are threaded openings through which the stems 46 of the valve structures are threaded. Jam-nuts 60 lock the valve structure in place and lock-nuts 62 cooperate with the jam-nuts to prevent any loosening of the valve structure, once it is adjusted. Each of the threaded stems 46 have flats 64 receptive of a wrench or tool by which the valve may be adjusted.

In extruding machines of this type, it is difficult to extrude a plurality of stock items at one time, particularly where the cross-sectional contour of the extruded items is at all complicated. One of the strips may be satisfactory but there may be flaws and void portions in one or all of the strip products, and may result in rejectible material. This can be overcome by use of the adjustable valves disposed in the path of flow of stock material to the die orifices. These valve structures are rigidly supported and disposed over the respective bushings so that the flow of stock material into the taper bore 36 may be controlled.

When the machine is set into operation, if the extruded product shows signs of voids or imperfect contour, the corresponding valve structure may be adjusted to modify the opening for the flow of the material to that die orifice. Loosening of the lock-nut 62 and the jam-nut 60 permits threading the valve head 44 toward and away from the taper bore 36 of the bushing. This will modify the resistance to flow of stock material to the respective die orifice, and when the lock and jam-nuts are re-set will maintain the relation of the valve structures one with respect to the other. During operation of the extrusion machine, the stock material will be forced to flow around and through the bridge structure and valve devices, which will maintain turbulence of the stock material and tend to keep the stock material in an extrudible condition. The taper wall 12 tends to increase the pressure with which the stock material in the chamber 14 enters the taper bore 36 of the bushings, and consequently accelerates the movement of the stock material passing into the taper bore 36 and around the conic head 44 of the valve structure. Both of the strips of extruded material will issue from the die plate in perfect and acceptable contour.

While the invention has been shown and described as relating to two strips of extruded material from two die orifices, it is recognized that the same features apply to a structure having more than two die orifices so long as a bushing and valve structure is incorporated for each individual die orifice.

Also, the invention has been described above with respect to the extrusion of a plurality of strips of identical contour with means for valving the flow of stock material equally to the similar die orifices. However, it is found that control can be effected with respect to dissimilar orifices. For instance, there might be two orifices of one contour and a third orifice of an entirely different contour in which case the valve devices 42 would be adjusted so as to control the flow of stock material to each orifice in the proportion that would best give the full-bodied extrusion therefrom. Thus, the flow to all of the orifices would not be equal but would be proportional to the need of material to give a perfect extrusion. It is likewise comprehended that one or more of the dissimilar orifices might be entirely blocked off if there is no outlet for that particular form.

While the embodiment of the present invention as herein disclosed constitutes a preferred form, it is to be understood that other forms might be adopted.

What is claimed is as follows:

1. In an extruding machine for extruding a plurality of parts from a single source of supply the combination comprising; a head member, a terminal member for said head member for providing a tapered bore, a removable die plate for closing the smaller end of said tapered bore in said terminal member and including a plurality of extrusion orifices therethrough at its outer side, means mounted on the die plate providing a plurality of tapered passages, one of which leads to each of said orifices, valve means carried solely by said die plate and including a plurality of conic members each adapted to be aligned with one of said plurality of tapered passages and each being individually adjustable towards and away from said orifices from within said tapered bore for proportioning the supply of material flowing to each of said die orifices, said conic members being positioned within the tapered bore with their smaller diameter ends pointing toward said orifices, and means for removably securing the die plate and the means supported thereby to said head member.

2. The machine as claimed in claim 1 wherein each conic member is positioned substantially centrally with respect to its aligned passage and being disposed remotely therefrom.

References Cited in the file of this patent

UNITED STATES PATENTS

| | | |
|---|---|---|
| 341,653 | Hartings | May 11, 1886 |
| 598,404 | Weichert | Feb. 1, 1898 |
| 1,350,722 | Goodenberger | Aug. 24, 1920 |
| 1,534,825 | Allison | Apr. 21, 1925 |
| 1,849,431 | Mayhew | Mar. 15, 1932 |
| 1,976,858 | Ritter | Oct. 16, 1934 |
| 2,091,125 | Stewart | Aug. 24, 1937 |
| 2,402,281 | Green | June 18, 1946 |
| 2,487,910 | Waddell et al. | Nov. 15, 1949 |
| 2,501,690 | Prendergast | Mar. 28, 1950 |